United States Patent [19]

Wrobel

[11] Patent Number: 4,586,759

[45] Date of Patent: May 6, 1986

[54] MODULAR FRAMING AND SUPPORT SYSTEM FOR LABORATORY FURNITURE

[75] Inventor: Keith A. Wrobel, Rogers, Minn.

[73] Assignee: LSI Corporation of America, Inc., Minneapolis, Minn.

[21] Appl. No.: 621,531

[22] Filed: Jun. 18, 1984

[51] Int. Cl.[4] .................. A47B 53/00; A47B 87/00
[52] U.S. Cl. .................................. 312/198; 312/107; 312/209; 312/246; 312/257 R
[58] Field of Search .............. 312/107, 111, 209, 198, 312/257 R, 263, 264, 242, 245, 246, 311, 306

[56] References Cited

U.S. PATENT DOCUMENTS

| | | | |
|---|---|---|---|
| 2,499,240 | 2/1950 | Alken | 312/246 |
| 2,937,767 | 5/1960 | Butler et al. | |
| 2,965,428 | 12/1960 | Jacobs et al. | 312/107 |
| 3,265,416 | 8/1966 | Downes | |
| 3,317,261 | 5/1967 | Peterson et al. | 312/246 |
| 3,712,696 | 1/1973 | McDonnell | 312/306 |
| 3,879,096 | 4/1975 | Blodee | 312/257 R |
| 3,899,228 | 8/1975 | Schreiber | 312/198 |
| 3,920,299 | 11/1975 | Propst et al. | 312/107 |
| 3,948,581 | 4/1976 | Helman et al. | 312/198 |
| 4,196,953 | 4/1980 | Krakow | 312/209 |
| 4,457,436 | 7/1984 | Kelley | 312/246 |
| 4,468,067 | 8/1984 | Jenkins | 312/111 |

FOREIGN PATENT DOCUMENTS

| | | | |
|---|---|---|---|
| 2654395 | 8/1978 | Fed. Rep. of Germany | 312/209 |
| 2805143 | 9/1979 | Fed. Rep. of Germany | 312/209 |
| 708423 | 6/1966 | Italy | 312/111 |

OTHER PUBLICATIONS

"General Engineering Catalog No. 9" by Unistrut Corporation; Copyright 1979; pp. 1-4, 7, 13, & 20.
"P-1" by Interflow Systems.
"A New World of Laboratory Planning with PLI Systems" by Portable Laboratories, Inc.; pp. 1-10.
"Suspended Flexible Cantilevered Casework Systems" by Ly-Line Products Inc.

Primary Examiner—Victor N. Sakran
Attorney, Agent, or Firm—Merchant, Gould, Smith, Edell, Welter & Schmidt

[57] ABSTRACT

A modular system (30) for framing and supporting work surfaces and storage units includes a pair of generally rectangular end frames (32) having side member (36) each defining inside and outside channel sections. The end frames (32) are releasably secured together by lateral connectors (34) which are adjustably clamped along the inside channel portions of the end frame side members (36). The lateral connectors (34) are adapted for supporting storage units by means of inverted J-shaped hooks 70. The work surfaces are independently supported on arms (84) which are adjustably clamped along the outside channel sections of the end frame side members (36) in order to facilitate rearrangement and adjustment in accordance with the requirements of laboratories and the like. A modular system (120) adapted for use with existing structural walls (128) is also disclosed.

15 Claims, 15 Drawing Figures

MODULAR FRAMING AND SUPPORT SYSTEM FOR LABORATORY FURNITURE

TECHNICAL FIELD

The present invention relates generally to a system for adjustably and relocatably supporting furniture of the type used in laboratories and the like. More particularly, this invention concerns a modular system for supporting work surfaces and storage units by releasable bolting, clamping and hanging so as to achieve better adjustability, relocatability, and thus versatility in adapting the system for use in various applications such as laboratories and the like.

BACKGROUND OF THE INVENTION

Scientific and medical laboratories often have variable equipment and storage requirements. Not only do these requirements differ between different laboratories conducting different work, but they can often differ within the same laboratory conducting various aspects of the same general type of work. Various amounts and types of work surfaces, storage units and the like are required, and these in turn are often affected by the kind of equipment being utilized. Such equipment often has particular electrical, gas, compressed air, or water supply requirements. In addition, various personnel are typically involved and it is desirable to locate the work surfaces, storage units, etc. at a convenient height. The work conducted in such laboratories can take place over either relatively short or long time periods, and a change in equipment, in personnel and/or in the type of work being conducted can affect the work surface and storage requirements, including both location and adjustability.

In the past, the common approach has been to custom design and permanently install furniture suited to the present or anticipated requirements. Such custom installations are quite expensive and do not provide the degree of versatility needed to adapt to the changing requirements of such laboratories. Attempts have been made to design or build more versatility into such custom installations, however, they have not been generally satisfactory and have provided only limited improvement. For example, it is sometimes necessary to rearrange the furniture in order to change the work surface and storage capacities in different areas of a laboratory. Customized furniture usually cannot be rearranged without at least some remodeling, which is expensive, time consuming and disruptive of work in other areas of the laboratory. Further, such rearrangement usually involves only relocation but not height adjustment. In addition, separate rearrangement of the electrical and plumbing corrections are often required. The customized approach to the installation of laboratory furniture is thus too rigid and does not provide the kind of versatility needed.

Some attempts have been made to devise laboratory furniture of greater versatility, however, these prior art attempts also have not been satisfactory because they have not provided the continuation of support and adjustability needed, nor the desired ease and convenience of initial assembly, adjustment after assembly, disassembly and reassembly as necessary. For example, some adjustable working surfaces and storage units are adapted only for mounting in a fixed position on a wall or other existing vertical surface, and are not capable either of convenient adjustment or of free standing use.

A need has thus arisen for an improved furniture supporting system which is adapted to provide more convenient assembly, adjustment, relocation and versatility, particularly in a laboratory setting.

SUMMARY OF THE INVENTION

The present invention comprises an improved modular framing and support system for laboratory or institutional furniture which overcomes the foregoing and other difficulties associated with the prior art. In accordance with the invention, there is provided a framing or support system of modular construction which, in a first embodiment, can be adapted either for free standing use on the floor away from a wall, or semifree-standing use against a wall, and which can be interconnected in stacked or end to end relationship to suit the desired arrangement. Each support module comprises a pair of generally rectangular upright end frames interconnected at each side by at least one lateral connector. The sides of the end frames are of generally H-shaped cross section to define continuous vertical inside and outside channel portions. Legs can be secured to the outside channel portions of the sides of the end frames near the bottoms thereof for vertical stability, while arms can be secured at adjustable locations therealong for supporting a horizontal work surface. The connectors include end plates of J-shaped cross section which can be secured along the inside channel portions between corresponding sides of the end frames. Each connector is of generally channel-shaped cross section having inwardly turned legs for receiving hangers of cross section secured to the backs of cabinets and the like to construct the type of furniture arrangement desired. The components of each module are interconnected by bolting, clamping and hanging to facilitate assembly, adjustment, deassembly and reassembly.

In a second embodiment, rails of channel-like cross-section are mounted in vertically spaced relation on an existing structural wall. The rails are adapted for supporting cabinets and the like by means of inverted J-shaped hangers. Horizontal work surfaces are supported on either rail by means of arms incorporating inverted J-shaped hangers, and, preferably, adjustable screw feet. Both work surfaces and cabinets attach to either rail to provide for optional attachments, vertically or laterally.

BRIEF DESCRIPTION OF DRAWINGS

A better understanding of the invention can be had by reference to the following Detailed Description in conjunction with the accompanying Drawings wherein.

DETAILED DESCRIPTION

Figures 1, 2:
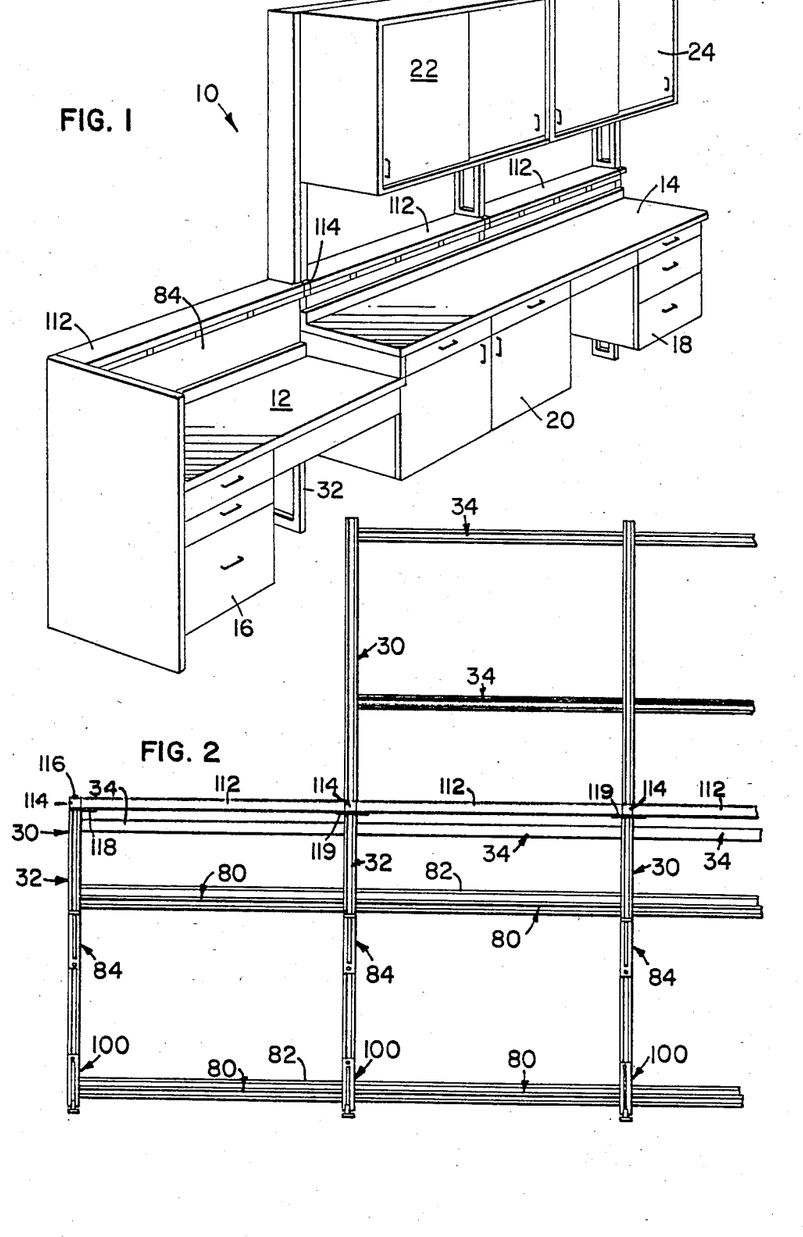
FIG. 1 is a perspective view of some laboratory furniture incorporating the first embodiment of the modular framing and support system of the invention.
FIG. 2 is a front view of the modular framing and support system of the invention.

Referring now to the Drawings, wherein like reference numerals designate like or corresponding elements throughout the views, and particularly referring to FIG. 1, there is shown a furniture module 10 incorporating the first embodiment of the framing and support system of the invention. The furniture module 10 includes various work surfaces and storage units, all of which are adjustably and relocatably supported on the modular framing and support system of the invention. In particular, a desk top 12 and counter top 14 are included in the module 10 as shown. A set of drawers 16 are provided beneath the desk top 12, while another set of drawers 18 and a cabinet 20 are provided beneath the counter top 14. In addition, another set of cabinets 22 and 24 are provided above the countertop 14. The furniture module 10 can be located either along a wall or away from a wall. As will be explained more fully hereinafter, the modular furniture framing and support system of the furniture herein is adapted to support the work surfaces and storage units by means of clamping and hanging in order to optimize assembly, adjustment, deassembly, and rearrangement so that the furniture can be configured and located as desired to achieve more versatility and convenience.

Figure 3:
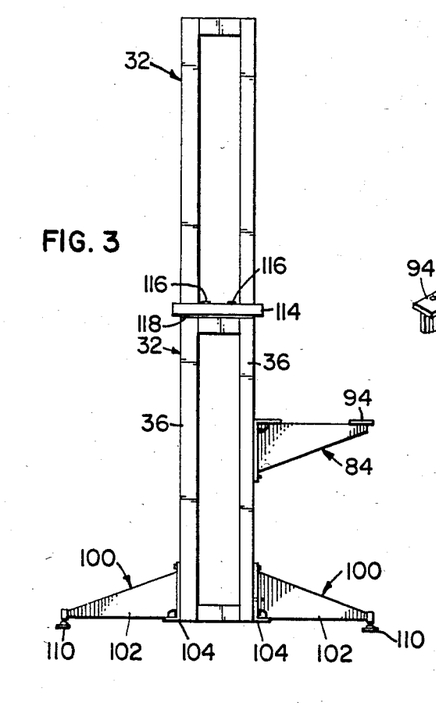
FIG. 3 is an end view thereof.
Figure 7:
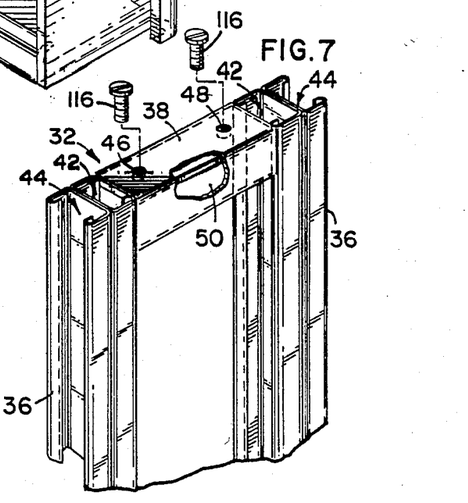
FIG. 7 is a partial perspective view of the top end of one of the end frames.

Referring now to FIGS. 2 and 3, along with FIG. 7, there are shown the framing and support modules 30 of the invention. It will be seen that the modules 30 can be interconnected in stacked or end to end relationship in accordance with the requirements of the particular system 10 desired. Each framing and support module 30 includes a pair of upright end frames 32 which are interconnected by lateral connectors 34 to define a structural unit for adjustably supporting various work surfaces and storage units. The vertical end frames 32 are of generally rectangular shape and suitable overall size so as to define an internal chase within each module 30 for electrical and gas lines, plumbing and the like. For example, the end frames 32 can be about 8 or 10 inches wide by 41¼ inches tall by 1⅝ inches deep.

In particular, each vertical end frame 32 comprises a pair of side members 36 of twin channel, generally H-shaped cross section interconnected at opposite ends by top and bottom members 38 and 40 of generally single channel-shaped cross sections. The outer ends of the legs of the H-shaped side members 36 are curled inwardly, as is best seen in FIG. 7, and define continuous inside and outside slots 42 and 44 extending along the entire height of the respective channel portions of each vertical end frame 32. The side members 36 can be constructed from sections of model P-4101 metal channel stock available from Uni-Strut Corporation of Wayne, Mich.

The top and bottom members 38 and 40 are of generally channel-shaped cross sections with the ends of the legs thereof preferably being turned inwardly similarly to the side members 36. For example, the top and bottom members 38 and 40 can be constructed from sections of model P-1000 metal channel stock from Uni-Strut Corporation. A pair of holes 46 and 48 are provided in each top and bottom member 38 and 40 for receiving bolts 116 by which the end frames 32 can be connected in stacked relationship. A plate 50 with tapped holes aligned with the holes 46 and 48 in the top member 38, is provided underneath the top member as is best seen in FIG. 7, for threaded engagement with the bolts 116 by which the end frames 32 are stacked and secured together. It will thus be appreciated that each end frame 32 is comprised of a pair of side members 36, each defining inside and outside channel slots 42 and 44, which side members are welded or otherwise interconnected by top and bottom members 38 and 40 to form a rigid structure of open rectangular shape.

Figures 4, 5:
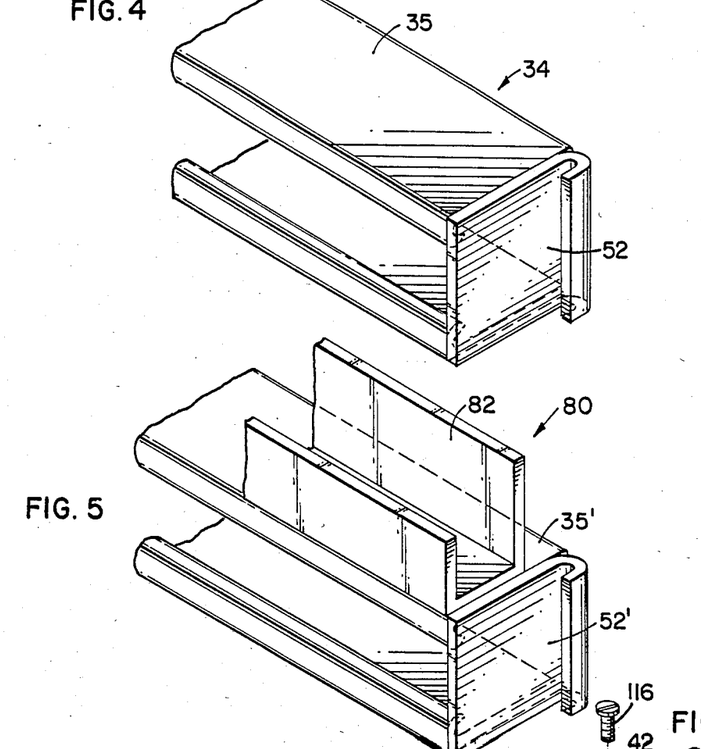
FIG. 4 is an enlarged partial perspective view of the end of one type of lateral connector for interconnecting the end frames.
FIG. 5 is an enlarged partial perspective view of the end of another type of lateral connector for interconnecting the end frames and supporting a vertical panel closure thereon.
Figure 8:
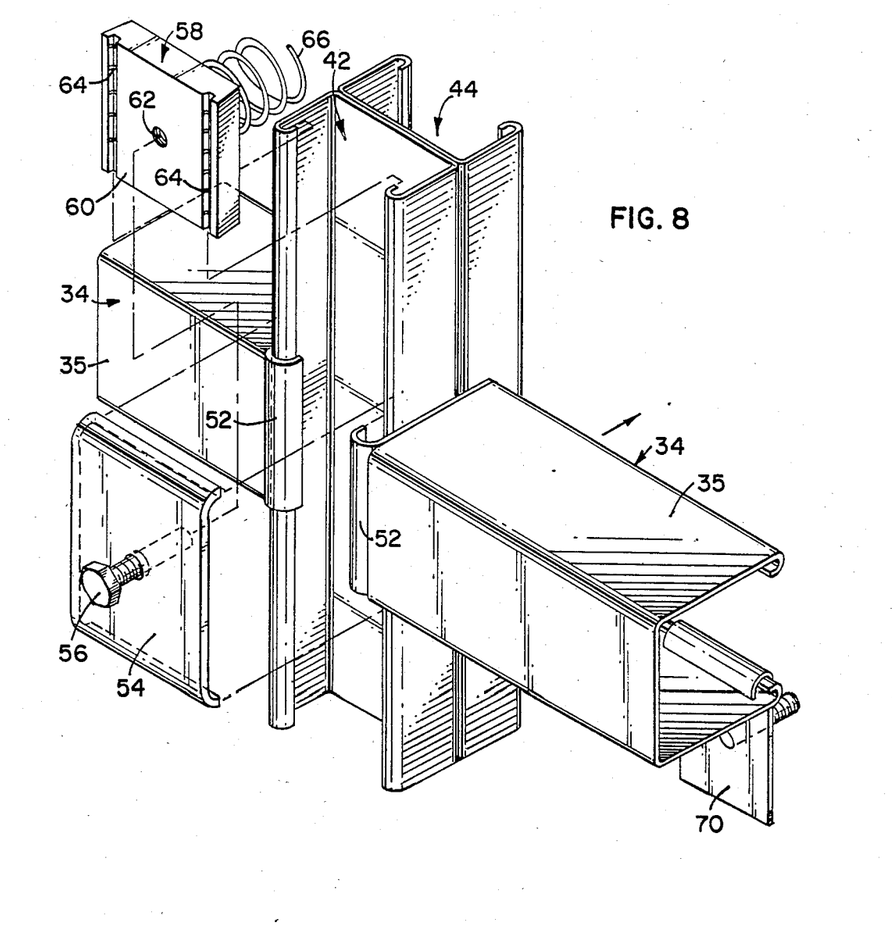
FIG. 8 is an exploded partial perspective illustrating connection of one of the lateral connectors to an end frame.

As mentioned above, the end frames 32 of each framing and support module are interconnected by lateral connectors 34, the details of which are best seen in FIGS. 4 and 8. Each lateral connector 34 is of general channel-shaped cross-section having inwardly turned ends. End plates 52 of J-shaped cross section are welded to the ends of the members 35, which can be constructed from model P-1000 metal channel sections available from Uni-Strut Corporation. The J-shaped end plates 52 are secured to the ends of members 35 such that the flat end adjoins the open side of the member and the curved end of the plate is located at the closed side of the member. Each connector 34 thus defines a lateral channel member 35 with J-shaped end plates 52.

This construction comprises a significant feature of the invention and enables the connectors 34 to be fitted over the inside channel portions of the side members 36 of the end frames 32, and secured in place as shown in FIG. 8. At least one connector 34 is provided between the corresponding side members 36 of each pair of end frames 32 of each module 30. The J-shaped end plates 52 of the connectors 34 extend over the inwardly turned ends of the inside channel portion of the associated side member 36 for slideable positioning therealong, and are releasably clamped in the desired position.

Clamping of the connectors 34 between end frames 32 is accomplished by means of a cover plate 54, bolt 56, and spring nut 58. The cover plate 54 extends over the J-shaped end plate 52 and engages the inside adjacent channel portion of the side member 36 on opposite sides thereof. The bolt 56 extends through a hole in the cover plate 54 and is threaded to the spring nut 58 positioned with the inside slot 42. A spring nut of suitable construction is also available from Uni-Strut Corporation. It will be noted that the spring nut 58 comprises a nut 60 having a drilled and tapped hole 62 for receiving the threaded end of the bolt 56, a pair of internally serrated grooves 64 for engaging the turned ends of the inside channel portion of the side members 36, and a compression spring 66 for normally urging the nut into such engagement. It will therefore be appreciated that the lateral connectors 34 can be positioned and releasably secured as desired at any vertical height between the corresponding side member 36 of the pair of end frames 32. A single cover plate 54, bolt 56 and spring nut 58 can be utilized to clamp the end of one connector 34 to the corresponding side member 36, or to clamp the ends of two connectors 34 in adjacent modules 30 to the side member of the common end frame 32.

Figure 6:
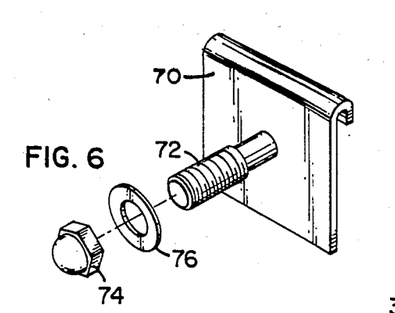
FIG. 6 is an exploded perspective view of a vertical connector for securing a cabinet or the like onto one of the lateral connector members shown in FIGS. 4 and 5.

When so positioned and clamped in place, the fasteners are located within the module 30 and the open sides of the connectors 34 are oriented outwardly for supporting the storage units of the furniture system 10 in hanging fashion by means of the inverted J-shaped hooks 70, one of which is shown in FIG. 8 engaged on a connector. An exploded view of one such hook 70 is shown in FIG. 6, and it will be seen that the hook is shaped similiarly to the end plates 52 of the connector 34. Instead of being welded or otherwise permanently secured in place, however, the inverted J-shaped hooks 70 preferably include lugs 72 by which they can be secured to the back panels of the cabinets or other storage units by means of nuts 74 and washers 76. Two or more such hooks 70, located in lateral and/or vertically spaced apart relationship, can be provided on the backs of the storage units for hanging engagement with one or more connectors 34, depending upon the weight of the particular storage unit.

Referring momentarily to FIG. 5, there is shown another form of connector 80 which is preferably utilized in addition to the connector 34 shown in FIG. 4. In the upper modules 30, for example, two connectors 34 would be secured between the outer side members 36 of frames 32 for supporting cabinets 22 and 24. In the lower modules 30, for example connectors 34 and/or connectors 80 would be secured between corresponding side members 36 of frames 32. The connector 80 is constructed similarly to the connector 34 and utilizes some common parts, which have been identified with the same reference numerals as those utilized in the description of the connector 34, but which have been differentiated therefrom by means of prime (') notations. The only difference between the connectors 34 and 80 comprises the fact that the alternate connector 80 includes an offset channel section 82 secured along one edge of the open side thereof for receiving the lower edge of a vertical closure panel 84 as shown in FIG. 1, to close the chase within each module 30. The closure panels 84 would be secured by conventional releasable spring latches and keepers (not shown). The alternate connector 8, of course, can also be utilized for receiving hooks 70 to support the storage units, and otherwise is connected and positioned similarly to connectors 34, but with the addition of the offset channel sections 82.

Figure 9:
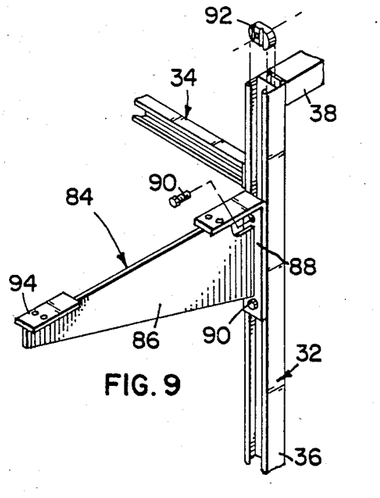
FIG. 9 is a partial perspective view of the top end of the end frames with a work surface support attached thereon.

The manner in which the work surfaces, such as the desk top 12 and counter top 14, are supported by the module 30 is shown in FIG. 9. It will be recalled that the inside channel portions of the side members 36 of the end frames 32 are utilized for securing the connectors 34 or 80 thereto in the desired vertical position in accordance with the particular storage units to be supported. The outside channel portions of the side members 36 are utilized for positioning and securing the work surface supports 84 in similar manner. Each support 84 includes an arm 86 secured at its inner end to an L-shaped bracket 88 which is clamped to the outside channel portion of the associated side member 36 by means of bolts 90 and spring nuts 92. The spring nuts 92 are constructed similarly to spring nut 58 shown in FIG. 8. A pair of holes are provided in the horizontal portion of the bracket 88, and in a horizontal plate 94 on the outer end of arm 86 for receiving fasteners such as screws extending into the underside of the associated work surface. It will thus be apparent that the work surfaces can be located at any desired height along the end frames 32 independently of positioning of the storage units, which are supported on the lateral connectors 34 or 80 clamped in place along the inside channel portions of the side members 36.

Figure 10:
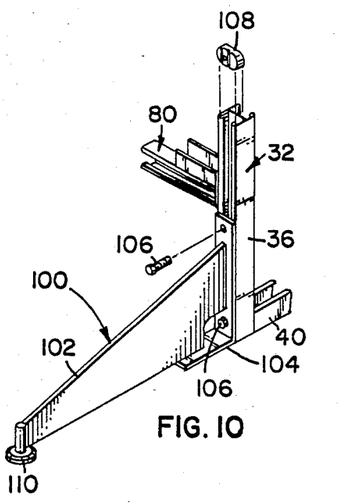
FIG. 10 is a partial perspective view of the lower end of one of the end frames with a floor support attached thereon.

Referring now to FIG. 10, the framing and support module 30 preferably includes floor supports 100 which are also secured along the outside channel portions of the side members of 36 of end frames 32, but at the lower ends thereof. Each floor support 100 includes a leg 102 having a L-shaped bracket 104 at its inner end which is secured by bolts 106 and spring nuts 108 to the side member 36 in similar fashion to the work surface supports 84. An integral leveling foot 110 with a conventional threaded cylinder is provided at the outer end of leg 102 to compensate for unevenness of the floor and otherwise remove any play which could allow rocking of the module 30. Pairs of floor supports 100 are preferably provided on opposite sides of the end frames 32 when the module 30 is located in a freestanding position away from a wall, as shown in FIGS. 2 and 3. When the module 30 is located along a wall, the floor supports 100 would be provided only on the outside side members 36.

Figure 11:
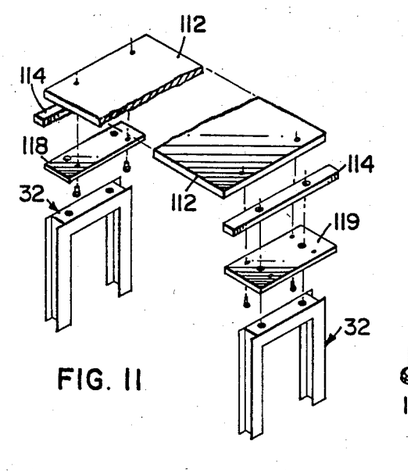
FIG. 11 is an exploded partial perspective view of the top ends of two adjacent end frames with a shelf mounted thereon.
Figure 12:
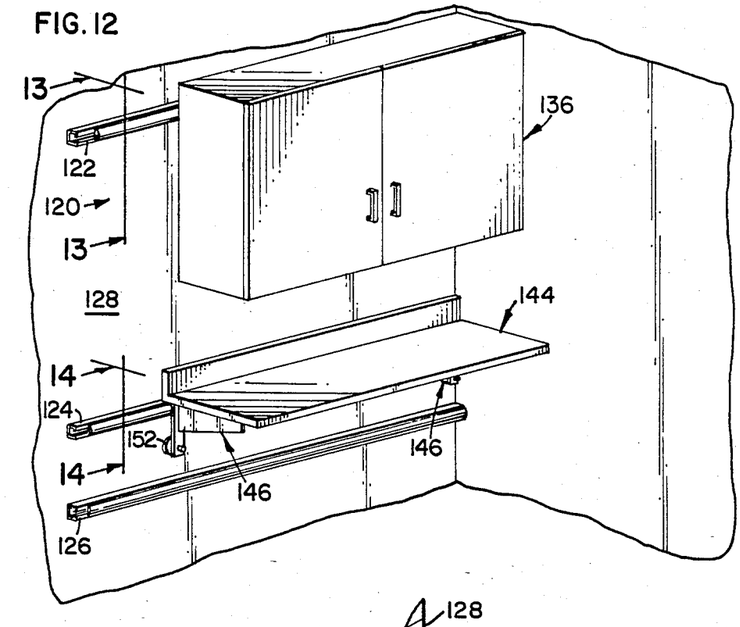
FIG. 12 is a perspective view of some laboratory furniture incorporating the second embodiment of the invention.

Referring again to FIG. 1 in conjunction with FIGS. 2 and 11, it will be seen that the top of each framing and support module 30 is preferably closed by means of a shelf 112 which extends between spacers 114 secured to the top members 38 of the end frames 32. The spacers 114 are secured by bolts 116 as best seen in FIG. 7, which extend through holes 46 and 48 in the associated top member 38 and screw into the drilled and tapped holes in the underlying plate 50. The shelf 112 in turn is supported on a intermediate plates 118 and 119 which are located between the spacer 114 and top member 38 and which extend beneath the end of the shelf. Plate 118 is for use with an endmost end frame 32, while plate 119 is for use on an intermediate end frame for supporting the ends of adjacent shelves 112.

Referring now to FIGS. 12 through 15, there is shown a furniture module 120 incorporating the second embodiment of the framing and support system of the present invention. Whereas the module 10 of the first embodiment is adapted for location either away from or along a wall, the module 120 of the second embodiment is adapted for mounting directly on an existing structural wall. In particular, the furniture module 120 includes an upper rail 122 and a pair of lower rails 124 and 126 mounted on the wall 128. The upper rail 122 is secured in place by fasteners 130, while the lower rails 124 and 126 are secured in place by fasteners 132 and 134, respectively, located at intervals along the rails. The fasteners 130, 132 and 134 can comprise, for example, molly bolts or other suitable fasteners. The rails 122, 124 and 126 comprise channel sections of generally C-shaped cross-section similar to the members 35 of connectors 34 of the module 10. The rails 122, 124 and 126 can be constructed from model P-1000 metal channel sections available from Unistrut Corporation.

Figures 13, 14, 15:
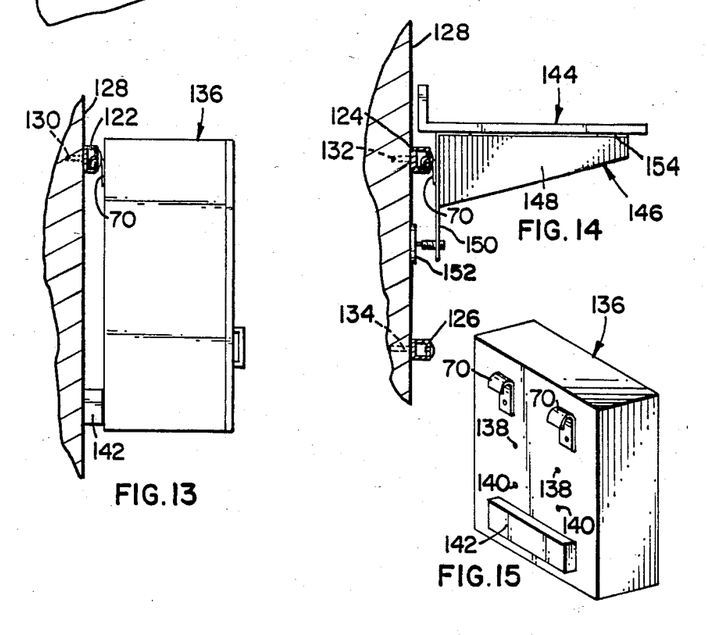
FIG. 13 is an end view of the storage unit supported on the upper rail.
FIG. 14 is an end view of the work surface supported on the lower rail.
FIG. 15 is a perspective view of the back of a cabinet showing the support hangers thereon.

The upper rail 122 is adapted for supporting a cabinet 136 or other storage unit thereon by means of inverted J-shaped hooks 70. As is best seen in FIG. 15, a pair of such hooks 70 are provided in laterally-spaced apart relationship on the back of the cabinet 136. If desired, additional sets of holes 138 and 140 can be provided on the back of the cabinet so that the location of the hooks 70 can be changed in order to provide for height adjustment of the cabinet. In the alternative, another rail like rail 122 can be provided for supporting the cabinet. A stand-off spacer 142 is also mounted on the back of the cabinet 136 so that the cabinet hangs straight. The spacer 142 is illustrated as a fixed member mounted on the cabinet, however, it can be adjustable and/or be mounted on the wall 128 instead, either of which is considered equivalent to the spacer disclosed herein.

The lower rails 124 and 126 are for supporting a desk top 144 or other work surface, together with additional storage units, if desired. In the preferred embodiment, a plurality of such supporting rails are utilized to provide for independent support and adjustment of the work surfaces and storage units. Any such storage units would be supported by hangers 70 on the lowermost rail 126 similar to the manner in which the cabinet 136 is supported on the upper rail 122. As best seen in FIG. 14, the desk top 144 is mounted on a pair of supports 146 each of which includes an arm 148 secured at its inner end to an L-shaped bracket 150 having a hook 70 at its upper end for engagement with one of the rails 124 and 126, and a leveling foot 152 for adjustable engagement with the existing construction wall 128. Holes (not shown) are provided in the horizontal portion of the bracket 150, and in a horizontal plate 154 on the outer end of arm 148 for receiving fasteners such as screws extending into the underside of the associated work surface. The support 146 and the vertical spacing between rails 124 and 126 are designed so that the desk top 144 can be positioned at the desired height on the appropriate rail without interference with the next adjacent lowermost rail, which could be utilized to support same, only at different height. Storage cabinets like cabinet 136 can be positioned laterally or vertically as desired by rail location.

The rails 122, 124 and 126 can be provided with snap-in closure strip as shown for purposes of appearance and cleanliness.

From the foregoing, it will thus be appreciated that the present invention comprises an improved framing and support module for an institutional furniture system which has numerous advantages over the prior art. One significant advantage involves the fact that each module utilizes rectangular end frames having inside and outside channel portions for independently supporting the work surfaces and storage units in separately adjustable positions by means of clamping and hanging. Another important advantage involves the fact that the modules can be bolted together in stacked relationship or clamped together in end-to-end relationship to build-up the desired system configuration. This construction provides maximum versatility, since the modules can be located either away from or along a wall, and also provides a convenient internal chase for the electrical lines, plumbing connections, etc. Other advantages will be evident to those skilled in the art.

Although particular embodiments of the invention have been illustrated in the accompanying Drawings, and described in the foregoing Detailed Description, it will be understood that the invention is not limited only to the embodiments disclosed, but is intended to embrace any alternatives equivalents, modifications and/or rearrangements of elements falling within the scope of the invention as defined by the following claims.

What is claimed is:

1. Apparatus for supporting horizontal work surfaces and storage units in independently adjustable fashion, comprising:
   a pair of upright end frames, each end frame including a side member defining inside and outside upright channel portions;
   a transverse connector extending between the side members of said end frames, each connector having opposite J-shaped ends adapted for slideable positioning along the inside channel portions of the side members of said end frames;
   clamp means for adjustably securing each end of said transverse connector along the corresponding inside channel portions of said end frames;
   means associated with said transverse connector for realeasably supporting a storage unit thereon; and
   means associated with the outside channel portions of said end frames for adjustably supporting a work surface thereon.

2. The apparatus of claim 1, wherein each of said end frames is of generally rectangular configuration including a pair of laterally spaced apart side members interconnected by top and bottom members.

3. The apparatus of claim 1, wherein said means for releasably supporting storage units along said connector comprises:
   a hook of generally inverted J-shaped cross section adapted for hanging engagement on said transverse connector, said connector being adapted to receive said hook;
   a lug extending from said hook; and
   a nut adapted for threaded engagement on said lug for securing the storage unit thereto.

4. The apparatus of claim 1, wherein said means for adjustably supporting a work surface comprises:
   an arm associated with each end frame, said arm being adapted for supporting the work surface thereon and having inner and outer ends with the inner end being adapted for slideable positioning along the outside channel portion of the side member of the associated end frame;
   a spring nut adapted for engaging the outside channel portion adjacent the inner end of said arm; and
   a bolt extending through the inner end of said arm and threadedly engaged with said spring nut for clamping said arm in place along the side member of the associated end frame.

5. The apparatus of claim 1, further including:
   a leg associated with each end frame, said foot having inner and outer ends with the inner end being adapted for slideable positioning along the outside channel portion of the side member of the associated end frame;
   a spring nut adapted for engaging the outside channel portion adjacent the inner end of said leg;
   a bolt extending through the inner end of said leg and threadedly engaging said spring nut to releasably clamp said leg to the associated end frame; and
   an adjustable foot mounted in the outer end of said leg.

6. The apparatus of claim 1, further including:

each of said end frames including a pair of laterally spaced apart side members interconnected by top and bottom members;

a spacer positioned on the top member of each end frame;

an intermediate plate positioned between each spacer and top member of the associated end frame, said intermediate plate projecting away from the associated end frame toward the other end frame;

a bolt extending through the spacer and intermediate plate in threaded engagement with the top member of each associated end frame; and a shelf mounted on said intermediate plates and extending between said spacers.

7. Apparatus for supporting horizontal work surfaces and storage units in independently adjustable fashion, comprising:

a pair of upright end frames, each end frame including a side member defining inside and outside upright channel portions;

a transverse connector extending between the side members of said end frames;

means for adjustably securing each end of said transverse connector along the corresponding inside channel portions of said end frames;

said means for adjustably securing each end of said connector along the inside channel portions of said end frames including:

an end plate of generally J-shaped cross section secured to each end of said transverse connector, said end plates being adapted to slideably engage the inside channel portions of the side members of said end frames for adjustable positioning therealong;

a clamp plate adapted for engaging each end plate and adjacent underlying inside channel portion of the associated side member;

a spring nut adapted for engagement with the inside channel portion of the associated side member; and a bolt extending through said clamp plate and threadedly engaged with said spring nut for clamping each end plate of said connector in place along the associated side member of the corresponding end frame;

means associated with said transverse connector for releasably supporting a storage unit thereon; and means associated with the outside channel portions of said end frames for adjustably supporting a work surface thereon.

8. Apparatus for supporting horizontal work surfaces and storage units in independently adjustable fashion, comprising:

a pair of upright end frames of generally rectangular configurations, each end frame including a pair of laterally spaced apart side members interconnected by top and bottom members;

the side members of said frames each defining inside and outside upright channel portions;

a pair of transverse connectors extending between the opposite corresponding side members of said end frames B1;

frames each connector having opposite J-shape ends adapted for slideable positioning along the inside channel portions of the side members of said end frames;

clamps means for adjustably securing each end of each transverse connector along the inside channel portions of the side members of said end frames;

means associated with said transverse connectors for releasably supporting a storage unit thereon; and means associated with the outside channel portions of said end frames for adjustably supporting a work surface thereon.

9. The apparatus of claim 8, wherein said means for releasably supporting storage units along said connector comprises:

a hook of generally inverted J-shaped cross section adapted for hanging engagement on said transverse connector, said connector being adapted to receive said hook;

a lug extending from said hook; and a nut adapted for threaded engagement on said lug for securing the storage unit thereto.

10. The apparatus of claim 8, wherein said means for adjustably supporting a work surface comprises:

an arm associated with each end frame, said arm being adapted for supporting the work surface thereon and having inner and outer ends with the inner end being adapted for slideable positioning along the outside channel portion of the side member of the associated end frame;

a spring nut adapted for engaging the outside channel portion adjacent the inner end of said arm; and a bolt extending through the inner end of said arm and threadedly engaged with said spring nut for clamping said arm in place along the side member of the associated end frame.

11. The apparatus of claim 8, further including:

a leg associated with at least one end frame, said foot having inner and outer ends with the inner end being adapted for slideable positioning along the outside channel portion of the side member of the associated end frame;

a spring nut adapted for engaging the outside channel portion adjacent the inner end of said leg;

a bolt extending through the inner end of said leg and threadedly engaging said spring nut to releasably clamp said leg to the associated end frame; and an adjustable foot mounted in the outer end of said leg.

12. The apparatus of claim 8, further including:

each of said end frames including a pair of laterally spaced apart side members interconnected by top and bottom members;

a spacer positioned on the top member of each end frame;

an intermediate plate positioned between each spacer and top member of the associated end frame, said intermediate plate projecting away from the associated end frame toward the other end frame;

a bolt extending through the spacer and intermediate plate in threaded engagement with the top member of each associated end frame; and a shelf mounted on said intermediate plates and extending between said spacers.

13. Apparatus for supporting horizontal work sufaces and storage units in independently adjustable fashion, comprising:

a pair of upright end frames of generally rectangular configurations, each end frame including a pair of laterally spaced apart side members interconnected by top and bottom members;

the side members of said frame each defining inside and outside upright channel portions;

a pair of transverse connectors extending between the opposite corresponding side members of said end frames;

means for adjustably securing each end of each transverse connector along the inside channel portions of the side members of said end frames;

said means for adjustably securing each end of said connector along the inside channel portions of said end frames including:

an end plate of generally J-shaped cross section secured to each end of said transverse connector, said end plates being adapted to slideably engage the inside channel portions of the side members of said end frames for adjustable positioning therealong;

a clamp plate adapted for engaging such end plate and adjacent underlying inside channel portion of the associated side member;

a spring nut adapted for engagement with the inside channel portion of the associated side member; and a bolt extending through said clamp plate and threadedly engaged with said spring nut for clamping each end plate of said connector in place along the associated side member of the corresponding end frame;

means associated with said transverse connectors for releasably supporting a storage unit thereon; and means associated with the outside channel portions of said end frames for adjustably supporting a work surface thereon.

14. A modular system for supporting horizontal work surfaces and storage units in independently adjustable fashion comprising:

a pair of upright end frames of generally rectangular configurations, each end frame including a pair of laterally spaced apart side members interconnected by top and bottom members;

the side members of each end frame defining inside and outside channel sections;

a pair of transverse connectors extending between the opposite corresponding side members of said end frames each connector having J-shaped ends adapted for slideable positioning along the inside channel section of the associated side member of the corresponding end frame;

clamp means for adjustably securing the ends of said transverse connectors along the inside channel sections of said end frames;

hanger means associated with said transverse connectors for releasably supporting a storage unit thereon;

arms associated with said end frames for supporting a work surface thereon, each arm having an inner end adapted for slideable positioning along the outside channel section of the associated side member of the corresponding side frame; and clamp means for adjustably securing the inner ends of said arms along the outside channel sections of said end frames.

15. A modular system for supporting horizontal work surfaces and storage units in independently adjustable fashion on a structural wall, which comprises:

an upper transverse rail secured to the wall, said upper rail being of specifically C-shaped cross section;

a pair of hooks of inverted specifically J-shape cross section secured to a storage unit and adapted for releaseably supporting the storage unit in depending relationship from said upper transverse rail allowing relocatability relative to said rails;

a spacer disposed between the storage unit and the wall to maintain the storage unit in plumb condition;

a pair of lower transverse rails secured to the wall in vertically spaced-apart relationship below said upper transverse rail, each lower transverse rail being of specifically C-shaped cross section;

a pair of arms secured to a work surface, each arm including a hook of inverted specifically J-shaped cross section for releasably supporting the work surface in depending relationship entirely from one of said lower transverse rails; and an adjustable spacer disposed between each arm and said wall in vertically spaced apart relationship with the associated lower transverse rail for effecting selective pivotal adjustment of the work surface so as to maintain said work surface in level condition.

* * * * *